(12) United States Patent
Endo et al.

(10) Patent No.: US 11,971,792 B2
(45) Date of Patent: Apr. 30, 2024

(54) DEVICE MANAGEMENT SYSTEM, NETWORK ADAPTER, SERVER, DEVICE, DEVICE MANAGEMENT METHOD, AND PROGRAM

(71) Applicant: Mitsubishi Electric Corporation, Tokyo (JP)

(72) Inventors: Hiroaki Endo, Tokyo (JP); Masahiro Ishihara, Tokyo (JP); Yoshitaka Otaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 394 days.

(21) Appl. No.: 17/601,794

(22) PCT Filed: Jun. 21, 2019

(86) PCT No.: PCT/JP2019/024808
§ 371 (c)(1),
(2) Date: Oct. 6, 2021

(87) PCT Pub. No.: WO2020/255402
PCT Pub. Date: Dec. 24, 2020

(65) Prior Publication Data
US 2022/0206911 A1  Jun. 30, 2022

(51) Int. Cl.
*G06F 21/70* (2013.01)
*G06F 11/20* (2006.01)
*G06F 21/64* (2013.01)

(52) U.S. Cl.
CPC .......... *G06F 11/2094* (2013.01); *G06F 21/64* (2013.01); *G06F 2201/85* (2013.01)

(58) Field of Classification Search
CPC ............................ G06F 11/2094; G06F 21/64
See application file for complete search history.

(56) References Cited

U.S. PATENT DOCUMENTS

2006/0155990 A1* 7/2006 Katsube .................. H04L 63/08
713/168
2013/0205378 A1* 8/2013 Oba .................. H04W 12/0431
726/7

(Continued)

FOREIGN PATENT DOCUMENTS

| JP | 2004-297292 A | 10/2004 |
| JP | 2005-038411 A | 2/2005 |
| JP | 2013-161217 A | 8/2013 |

OTHER PUBLICATIONS

Extended European Search Report dated Jun. 1, 2022, in the corresponding EP Patent Application No. 19933310.5.

(Continued)

*Primary Examiner* — Ponnoreay Pich
(74) *Attorney, Agent, or Firm* — POSZ LAW GROUP, PLC

(57) ABSTRACT

A device management system (1) includes a common certification information acquirer, a certifier, an identification information generator, and a setter. The common certification information acquirer acquires common certification information from a device (10) including a storage for storing the common certification information. The common certification information stored in the storage is shared with another device. The certifier certifies the device (10) based on the common certification information. The identification information generator generates identification information for identification of the device (10) certified by the certifier. The setter sets the identification information to the device (10).

7 Claims, 13 Drawing Sheets

(56) References Cited

U.S. PATENT DOCUMENTS

2017/0315728 A1* 11/2017 Zheng ............... G06F 3/0604
2022/0206911 A1* 6/2022 Endo ................ G06F 21/606

OTHER PUBLICATIONS

International Search Report dated Sep. 10, 2019 in the corresponding International Application No. PCT/JP2019/024808 (and English Machine Translation).

* cited by examiner

DEVICE MANAGEMENT SYSTEM, NETWORK ADAPTER, SERVER, DEVICE, DEVICE MANAGEMENT METHOD, AND PROGRAM

CROSS REFERENCE TO RELATED APPLICATION

This application is a U.S. National Stage Application of International Application No. PCT/JP2019/024808, filed on Jun. 21, 2019, the contents of which are incorporated herein by reference.

TECHNICAL FIELD

The present disclosure relates to a device management system, a network adapter, a server, a device, a device management method, and a program.

BACKGROUND ART

In accordance with the advance of the Internet of Things (IoT) technology, various services for devices, such as services related to remote control of devices and services related to monitoring of the states of devices, are being developed on the Internet. These services involve communication between a plurality of devices and a cloud server that provides the services, and thus require identification and certification of the devices in some cases.

For example, in a service in which the cloud server monitors the states of devices of users, the cloud server is required to identify the individual devices and then associate the devices with the respective users. If the cloud server is to selectively monitor the states of only the devices fabricated by a certain manufacturer in this service, the cloud server is further required to certify the devices.

Patent Literature 1 discloses a technique for achieving identification and certification of a device by incorporating device certification information unique to the device into the device in its manufacturing process. Patent Literature 1 discloses, as an example of the device certification information, a character string configured by coupling a device identifier (ID) for identification of the device and a passphrase to be verified during certification. The confirmation of the device ID can lead to identification of the device, and the verification of the passphrase can lead to certification of the device.

CITATION LIST

Patent Literature

Patent Literature 1: Unexamined Japanese Patent Application Publication No. 2005-38411

SUMMARY OF INVENTION

Technical Problem

Unfortunately, the technique disclosed in Patent Literature 1 suffers from the reduced productivity of devices because of the essential step of incorporating the information unique to the devices into the devices in the manufacturing process. The following description assumes an exemplary case where the device certification information is incorporated into devices by means of storage of the device certification information unique to the devices into read only memories (ROMs) provided to the respective devices. In this case, the manufacturing process of devices involves a step of storing pieces of device certification information different among the devices into the respective ROMs, resulting in an increase in the time for production of the devices. In addition, this configuration causes a risk of storing the identical piece of device certification information into the ROMs of different devices by mistake, resulting an increase in the cost for production management.

An objective of the present disclosure, which has been accomplished in view of the above situations, is to provide a device management system and the like that can achieve identification and certification of devices without a step of incorporating information unique to the devices into the devices in their manufacturing process.

Solution to Problem

In order to achieve the above objective, a device management system according to an aspect of the present disclosure includes: common certification information acquiring means for acquiring common certification information from a device including storage means for storing the common certification information, the common certification information stored in the storage means being shared with another device; certification means for certifying the device based on the common certification information; identification information generating means for generating identification information for identification of the device certified by the certification means; and setting means for setting the identification information to the device.

Advantageous Effects of Invention

The device management system according to an aspect of the present disclosure certifies the device based on the common certification information shared with another device, and sets the identification information for identification of the certified device to the device. The present disclosure can therefore achieve identification and certification of devices without a step of incorporating information unique to the devices into the devices in their manufacturing process.

DESCRIPTION OF EMBODIMENTS

Figure 1:
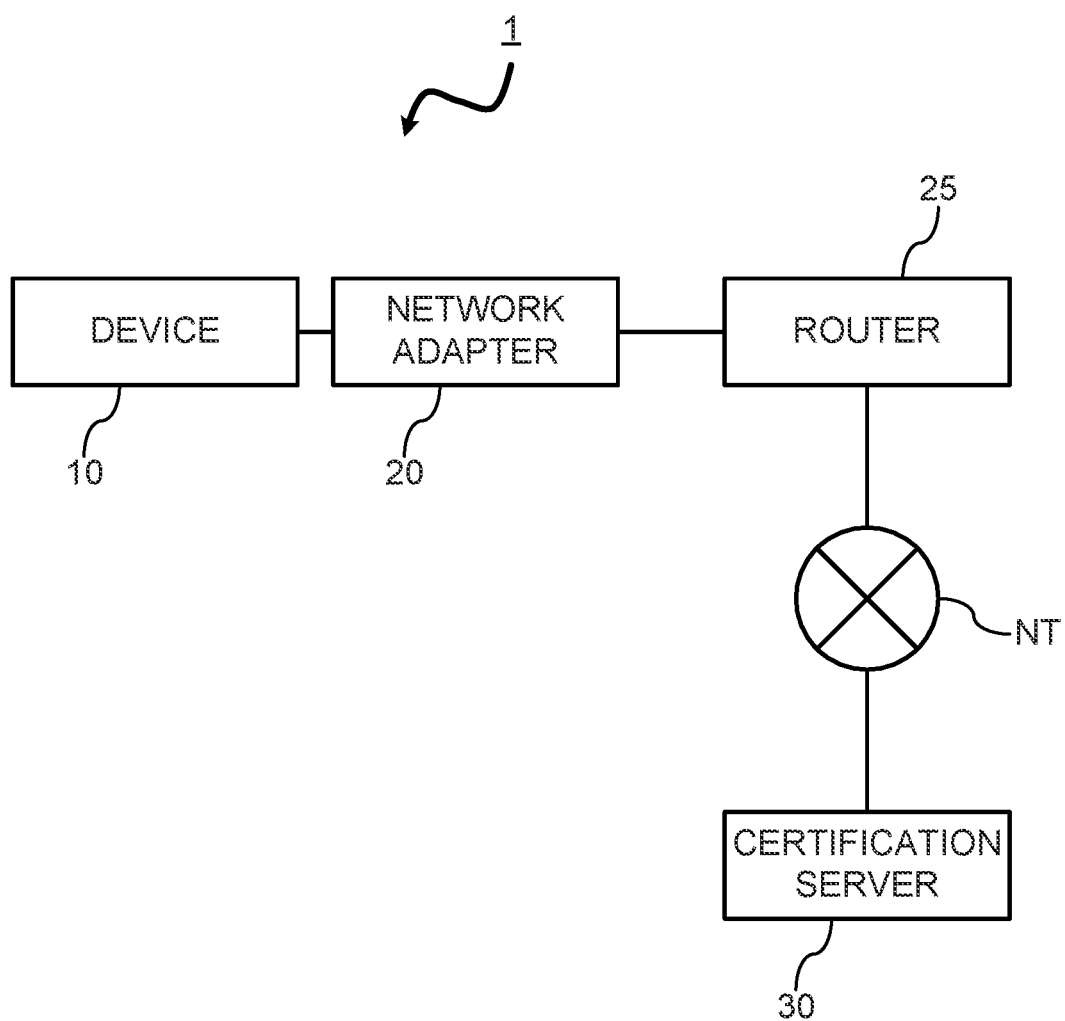
FIG. 1 illustrates a configuration of a device management system according to Embodiment 1 of the present disclosure.

A device management system according to embodiments of the present disclosure is described below with reference to the accompanying drawings. In the drawings, the components identical or corresponding to each other are provided with the same reference symbol.

Embodiment 1

A device management system 1 according to Embodiment 1 is described below with reference to FIG. 1. The device management system 1 sets identification information to a device in which information unique to the device was not embedded in its manufacturing process. The identification information serves for identification of the device. The device management system 1 includes a device 10, a network adapter 20, a router 25, and a certification server 30. The device management system 1 is an example of a device management system according to the present disclosure.

The device 10 is an electrical device, such as air conditioner, refrigerator, or television, installed in a house. The device 10 is connected to the network adapter 20. The device 10 communicates with the Internet NT via the network adapter 20 and the router 25. In the manufacturing process of the device 10, common certification information shared with other devices is embedded in the device 10, which is described in detail below. When the device 10 is certified on the basis of the common certification information, identification information for identification of the device 10 is set to the device 10, which is also described in detail below. The certification of the device 10 means confirmation that the device 10 was duly manufactured, for example. The certification of the device 10 can exclude a device manufactured by a third party other than the manufacturer of the device 10 from the subjects of setting of identification information, for example. The device 10 has a functional configuration described below. The device 10 is an example of a device according to the present disclosure.

The network adapter 20 is used while being mounted on the device 10, for example. The network adapter 20 is connected to the device 10 so as to communicate with the device 10 and relays the communication between the device 10 and the Internet NT. The network adapter 20 is connected to the router 25 so as to communicate with the router 25 via a wireless local area network (LAN), for example. The network adapter 20 communicates with the Internet NT via the router 25. The network adapter 20 acquires the common certification information embedded in the device 10 from the device 10 and transfers the common certification information to the certification server 30, which is described in detail below. The network adapter 20 sets the identification information received from the certification server 30 to the device 10, which is also described in detail below. The network adapter 20 has a functional configuration described below. The network adapter 20 is an example of a network adapter according to the present disclosure.

The router 25 is connected to the network adapter 20 and the Internet NT. The router 25 is a wireless router installed in a house, for example.

The certification server 30 certifies the device 10 on the basis of the common certification information received from the network adapter 20, generates identification information for identification of the certified device, and transmits the identification information to the network adapter 20. The certification server 30 is managed by the manufacturer of the device 10, example. The certification server 30 has a functional configuration described below. The certification server 30 is an example of a server according to the present disclosure.

The identification information generated by the certification server 30 and set to the device 10 by the network adapter 20 is transmitted to a cloud server, in a service related to remote control of a device or a service related to monitoring of the state of a device by means of the cloud server, for example. The transmitted identification information enables the cloud server to identify the device 10.

The identification information generated by the certification server 30 is, for example, an identifier configured by coupling a character string indicating the domain name of the certification server 30, a character string indicating the date and time when the device 10 was certified by the certification server 30, and a character string generated at random. The identification information generated in this manner can be made unique to each device. Alternatively, the identification information may be device IDs having serial numbers, which are issued from the certification server 30 in the certification of the individual devices. The identification information may also be generated by another procedure provided that the devices are fed with mutually different pieces of identification information.

The common certification information embedded in the device 10 in the manufacturing process is a digital certificate pursuant to the X.509 standard, for example. This digital certificate is issued from a certification authority under management of the manufacturer of the device 10, for example. In the manufacturing process of other devices, the common certification information identical to the common certification information embedded in the device 10 is embedded in the other devices. Examples of the "other devices" include devices provided by the same manufacturer, devices of the same model, and devices of the same production lot.

The certification server 30 certifies the device 10 on the basis of the received common certification information, using certification reference data. The certification reference data is identical to the common certification information, for example. In an exemplary case where the common certification information is an above-mentioned digital certificate, the certification reference data is identical to the digital certificate. In this case, the certification server 30 certifies the device 10 by determining whether the received common certification information coincides with the certification reference data. Alternatively, the certification reference data may be a hash value derived from the common certification information. In this case, the certification server 30 certifies the device 10 by determining whether the hash value derived from the received common certification information coincides with the certification reference data.

Preferably, the common certification information and the certification reference data are secretly managed by the manufacturer of the device 10 so as not to be leaked to the outside.

Figure 2:
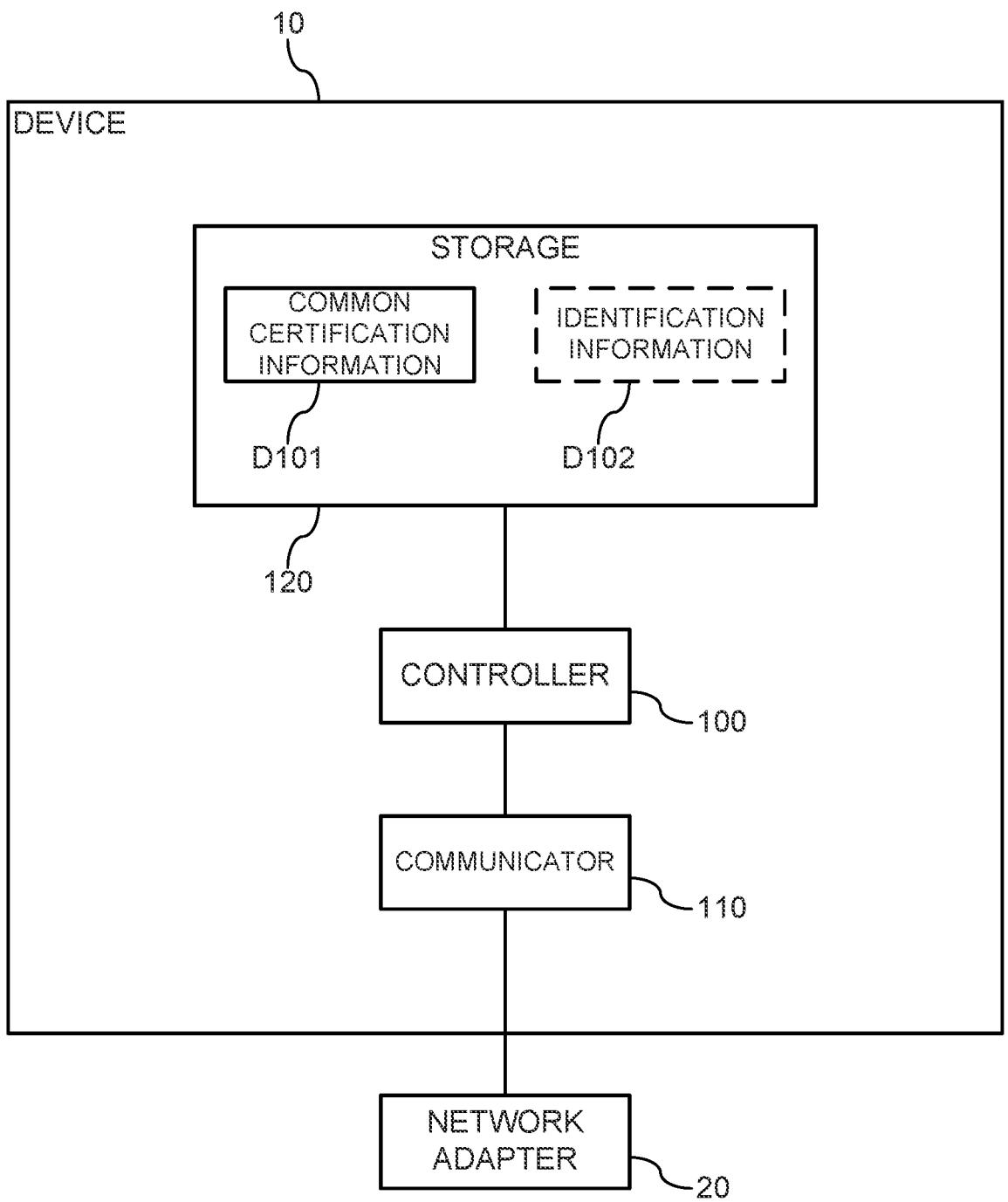
FIG. 2 illustrates a functional configuration of a device according to Embodiment 1 of the present disclosure.

The functional configuration of the device 10 is described below with reference to FIG. 2. The device 10 includes a controller 100, a communicator 110, and a storage 120.

The controller 100 performs comprehensive control of the device 10. The controller 100 has the functions described below in particular. The controller 100 transmits common certification information D101 stored in the storage 120 to the network adapter 20 via the communicator 110. The controller 100 causes identification information D102 received from the network adapter 20 via the communicator 110 to be stored into the storage 120. The controller 100 is an example of identification information retaining means according to the present disclosure.

The communicator 110 communicates with the network adapter 20. The communicator 110 is achieved by a universal asynchronous receiver and transmitter (UART) for communication with the network adapter 20, for example.

The storage 120 stores the common certification information D101 and the identification information D102. The common certification information D101 is stored into the storage 120 in the manufacturing process of the device 10. The identification information D102 has not been stored in the storage 120 in the manufacturing process of the device 10. Instead, the identification information D102 is stored into the storage 120 after reception of the identification information D102 from the network adapter 20. The identification information D102 is therefore represented by a dashed line in FIG. 2. The storage 120 is an example of storage means according to the present disclosure.

Figure 3:
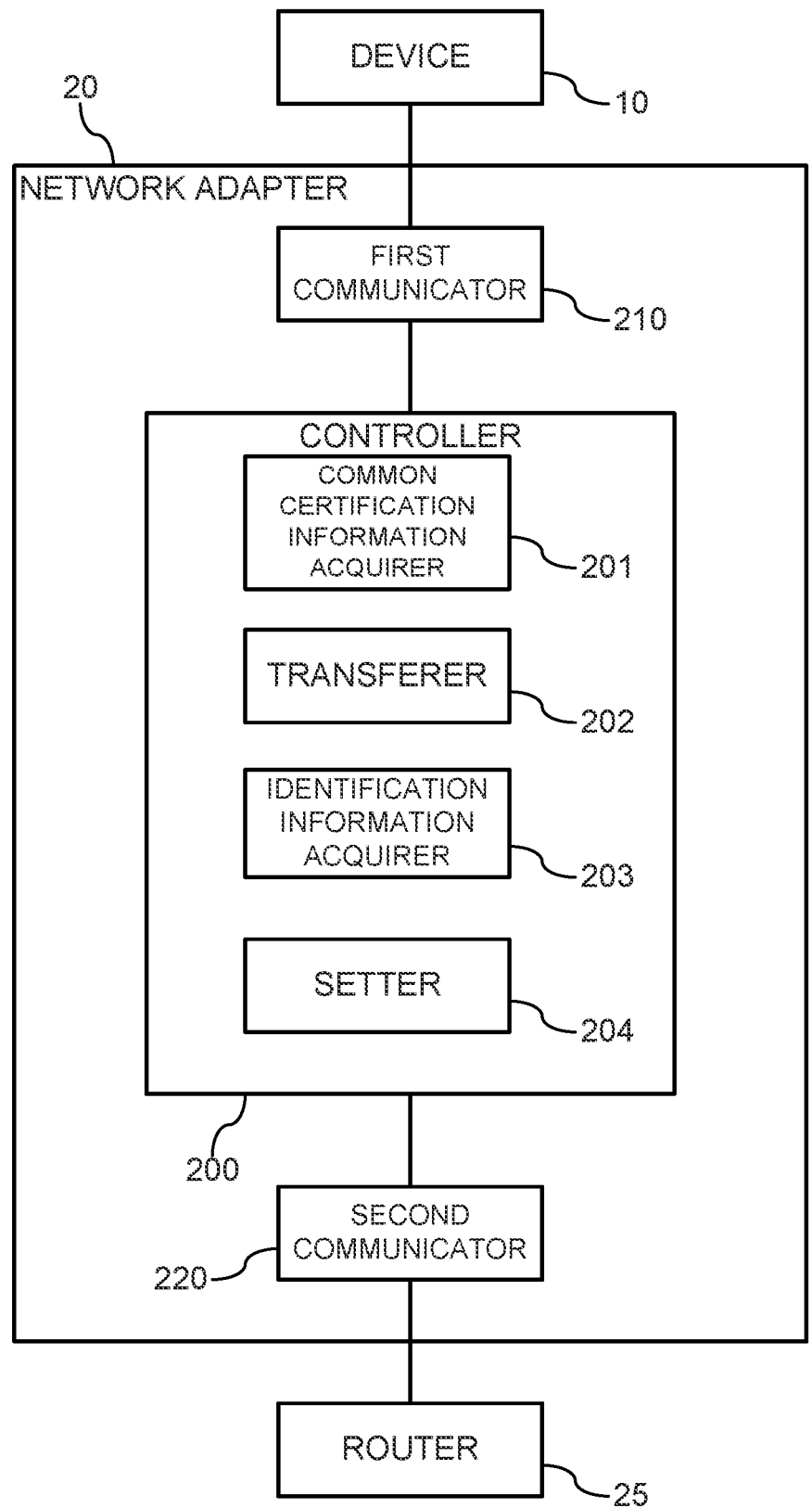
FIG. 3 illustrates a functional configuration of a network adapter according to Embodiment 1 of the present disclosure.

The functional configuration of the network adapter 20 is described below with reference to FIG. 3. The network adapter 20 includes a controller 200, a first communicator 210, and a second communicator 220.

The controller 200 performs comprehensive control of the network adapter 20. The controller 200 includes a common certification information acquirer 201, a transferer 202, an identification information acquirer 203, and a setter 204.

The common certification information acquirer 201 acquires the common certification information D101 received from the device 10 via the first communicator 210. The common certification information acquirer 201 is an example of common certification information acquiring means according to the present disclosure.

The transferee 202 transfers the data, which is received from the device 10 via the first communicator 210, to the certification server 30 via the second communicator 220. The transferer 202 also transfers the data, which is received from the certification server 30 via the second communicator 220, to the device 10 via the first communicator 210. In particular, the transferee 202 transfers the common certification information D101 received from the device 10 to the certification server 30, and transfers the identification information D102 received from the certification server 30 to the device 10.

The transferer 202 does not necessarily transfer the original received data. For example, the transferer 202 does not have to transfer the data transmitted and received only between the device 10 and the network adapter 20, or the data transmitted and received only between the network adapter 20 and the certification server 30. The transferer 202 may encrypt the data received from the device 10 and then transfer the encrypted data, for example. In an exemplary case where the data received from the certification server 30 is encrypted, the transferer 202 may decrypt the data and then transfer the decrypted data to the device 10.

Alternatively, in parallel to transfer of data, the transferer 202 may transmit a command related to the data, for example. In an exemplary case of transfer of the common certification information D101, the command related to the data corresponds to a command for requesting the certification server 30 to certify the device 10 and transmit the identification information D102. In another exemplary case of transfer of the identification information D102, the command related to the data corresponds to a command for requesting the device 10 to store the identification information D102. These processes are hereinafter referred to simply as "transfer" regardless of whether the transfer accompanies transmission of a command.

The identification information acquirer 203 acquires the identification information D102 received from the certification server 30 via the second communicator 220.

The transferer 202 transfers the identification information D102 acquired by the identification information acquirer 203 to the device 10, and the setter 204 thus sets the identification information D102 to the device 10. The setter 204 is an example of setting means according to the present disclosure.

The first communicator 210 communicates with the device 10. The communicator 110 is achieved by a UART for communication with the device 10, for example.

The second communicator 220 communicates with the router 25. The communication of the second communicator 220 with the router 25 enables the network adapter 20 to communicate with the certification server 30 via the router 25. The second communicator 220 is achieved by a wireless LAN module, which can communicate with the wireless router 25, for example.

Figure 4:
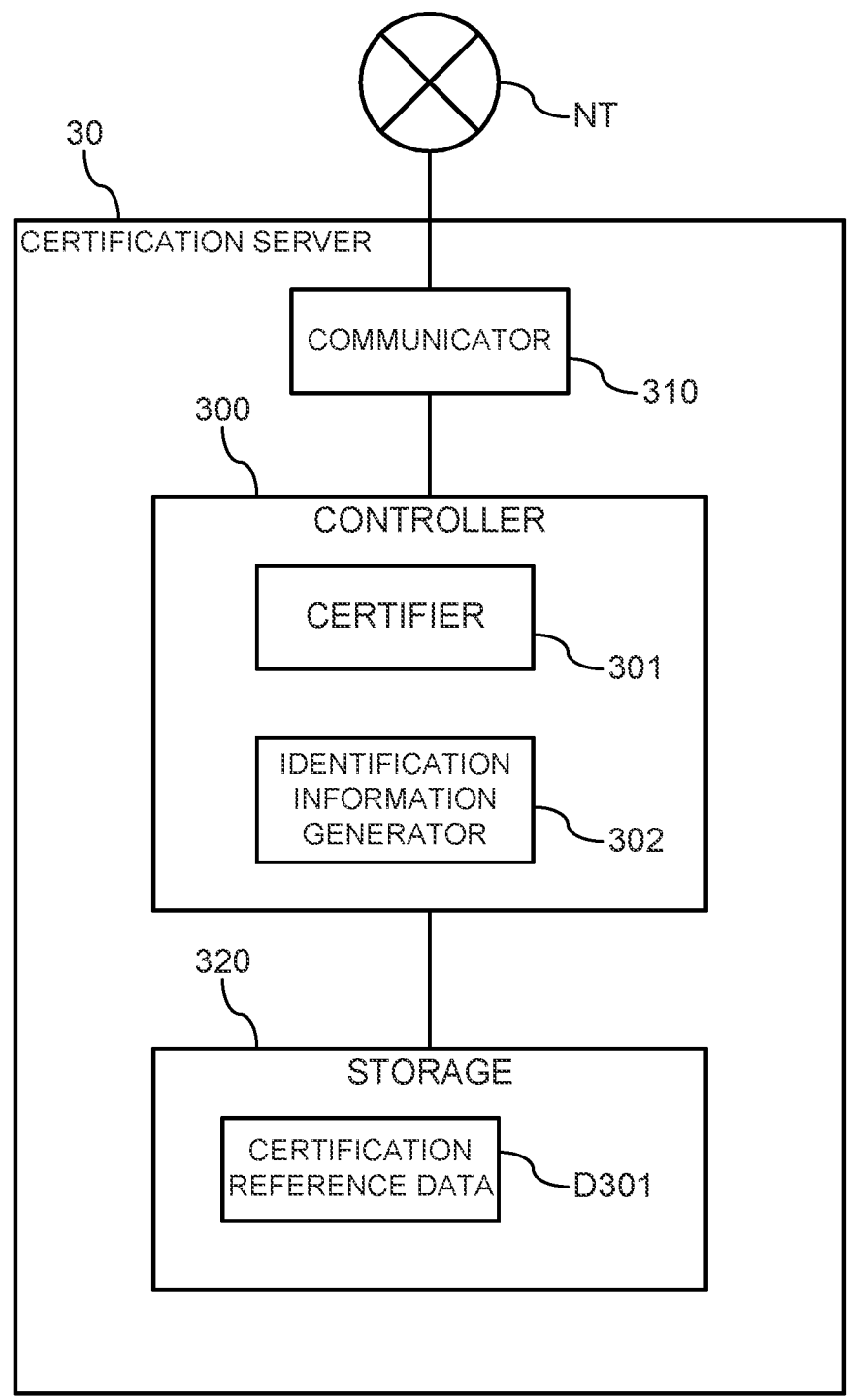
FIG. 4 illustrates a functional configuration of a certification server according to Embodiment 1 of the present disclosure.

The functional configuration of the certification server 30 is described below with reference to FIG. 4. The certification server 30 includes a controller 300, a communicator 310, and a storage 320.

The controller 300 performs comprehensive control of the certification server 30. The controller 300 includes a certifier 301 and an identification information generator 302.

The certifier 301 certifies the device 10 on the basis of the common certification information D101 received from the network adapter 20 via the communicator 310. For example, the certifier 301 certifies the device 10 by verifying the common certification information D101 using certification reference data D301, which is described below, stored in the storage 320. In the above-mentioned exemplary case where the certification reference data D301 is the binary data identical to the common certification information D101, the certifier 301 certifies the device 10 by determining whether the common certification information D101 coincides with the certification reference data D301. In the above-mentioned other exemplary case where the certification reference data D301 is a hash value derived from the common certification information D101, the certifier 301 certifies the device 10 by determining whether the hash value derived from the common certification information D101 coincides with the certification reference data D301. The certifier 301 is an example of certification means according to the present disclosure.

The identification information generator 302 generates the identification information D102 for identification of the device 10 certified by the certifier 301. As described above, devices have mutually different pieces of identification information D102. The identification information generator 302 can generate pieces of identification information different among the devices, for example, by yielding a character string that contains a character string indicating the domain name of the certification server 30, a character string indicating the date and time when the device 10 was certified by the certification server 30, and a character string generated at random. The identification information generator 302 is an example of identification information generating means according to the present disclosure.

The communicator 310 communicates with the network adapter 20 via the Internet NT and the router 25. The communicator 310 is achieved by a network interface connected to the Internet NT, for example.

The storage 320 stores the certification reference data D301. The certification reference data D301 is preliminarily stored into the storage 320 by an administrator of the certification server 30, for example.

Figure 5:
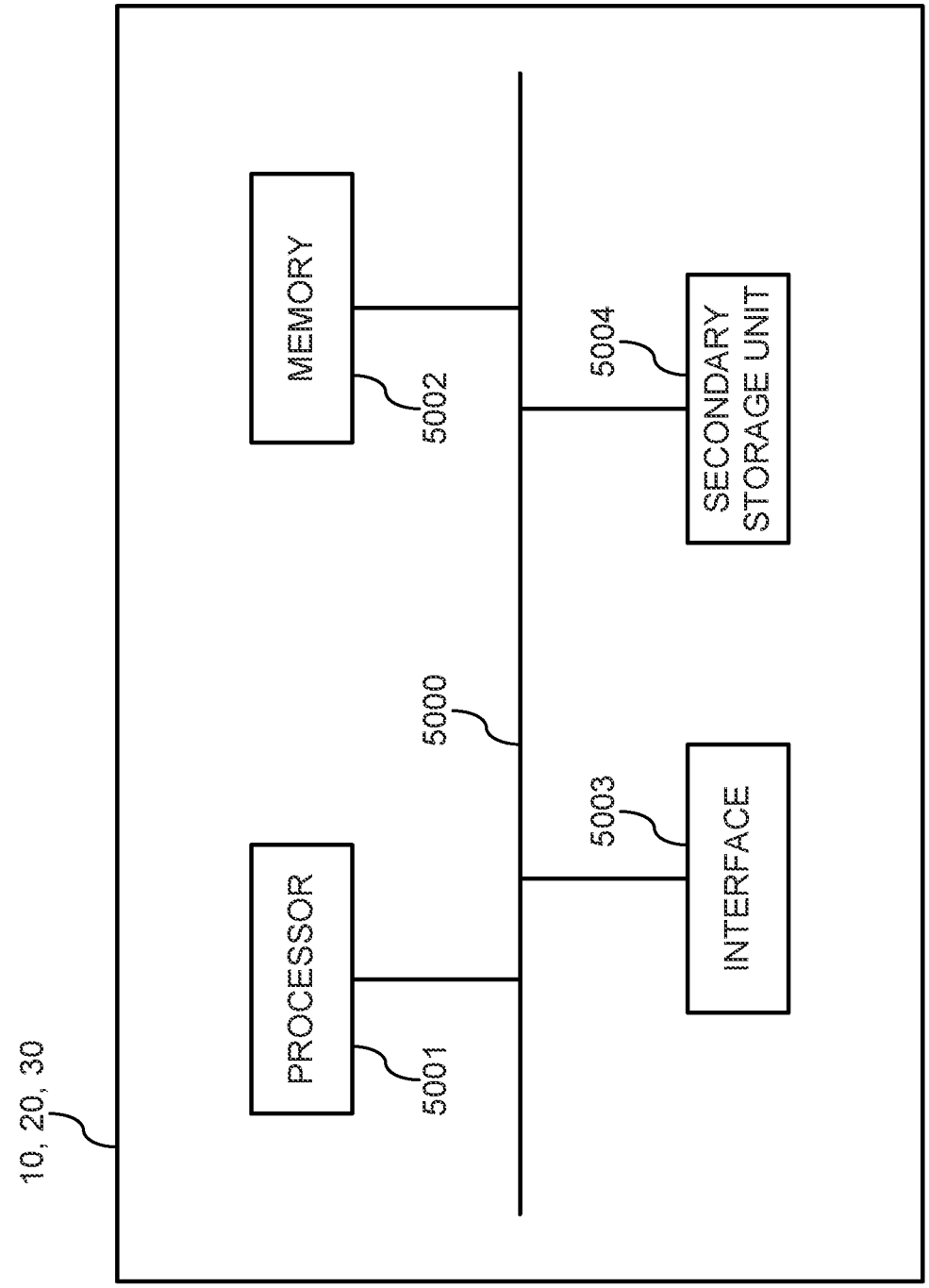
FIG. 5 illustrates an exemplary hardware configuration of the device, the network adapter, or the certification server according to Embodiment 1 of the present disclosure.

An exemplary hardware configuration of the device 10, the network adapter 20, or the certification server 30 (which are hereinafter collectively referred to as "device 10 and the like") is described below with reference to FIG. 5. The device 10 and the network adapter 20 illustrated in FIG. 5 are achieved by micro-controllers, for example. The certification server 30 illustrated in FIG. 5 is achieved by a computer for a server, for example. That is, the device 10 and the like illustrated in FIG. 5 are achieved by computers, for example.

The device 10 or the like includes a processor 5001, a memory 5002, an interface 5003, and a secondary storage unit 5004, which are connected to each other via buses 5000.

The processor 5001 is a central processing unit (CPU), for example. The processor 5001 loads an operational program stored in the secondary storage unit 5004 into the memory 5002 and executes the operational program, and thereby achieves the individual functions of the device 10 or the like.

The memory 5002 is a primary storage unit including a random access memory (RAM), for example. The memory 5002 stores the operational program loaded by the processor 5001 from the secondary storage unit 5004. The memory 5002 also serves as a working memory during execution of the operational program at the processor 5001.

The interface 5003 is an input/output (I/O) interface, such as serial port, universal serial bus (USB) port, or network interface. The interface 5003 may be connected to a communication module, such as UART or wireless LAN module. The interface 5003 can achieve the functions of the communicator 110, the first communicator 210, the second communicator 220, and the communicator 310.

The secondary storage unit 5004 is a flash memory, a hard disk drive (HDD), or a solid state drive (SSD), for example. The secondary storage unit 5004 stores the operational program to be executed by the processor 5001. The secondary storage unit 5004 can achieve the functions of the storage 120 and the storage 320.

Figure 6:
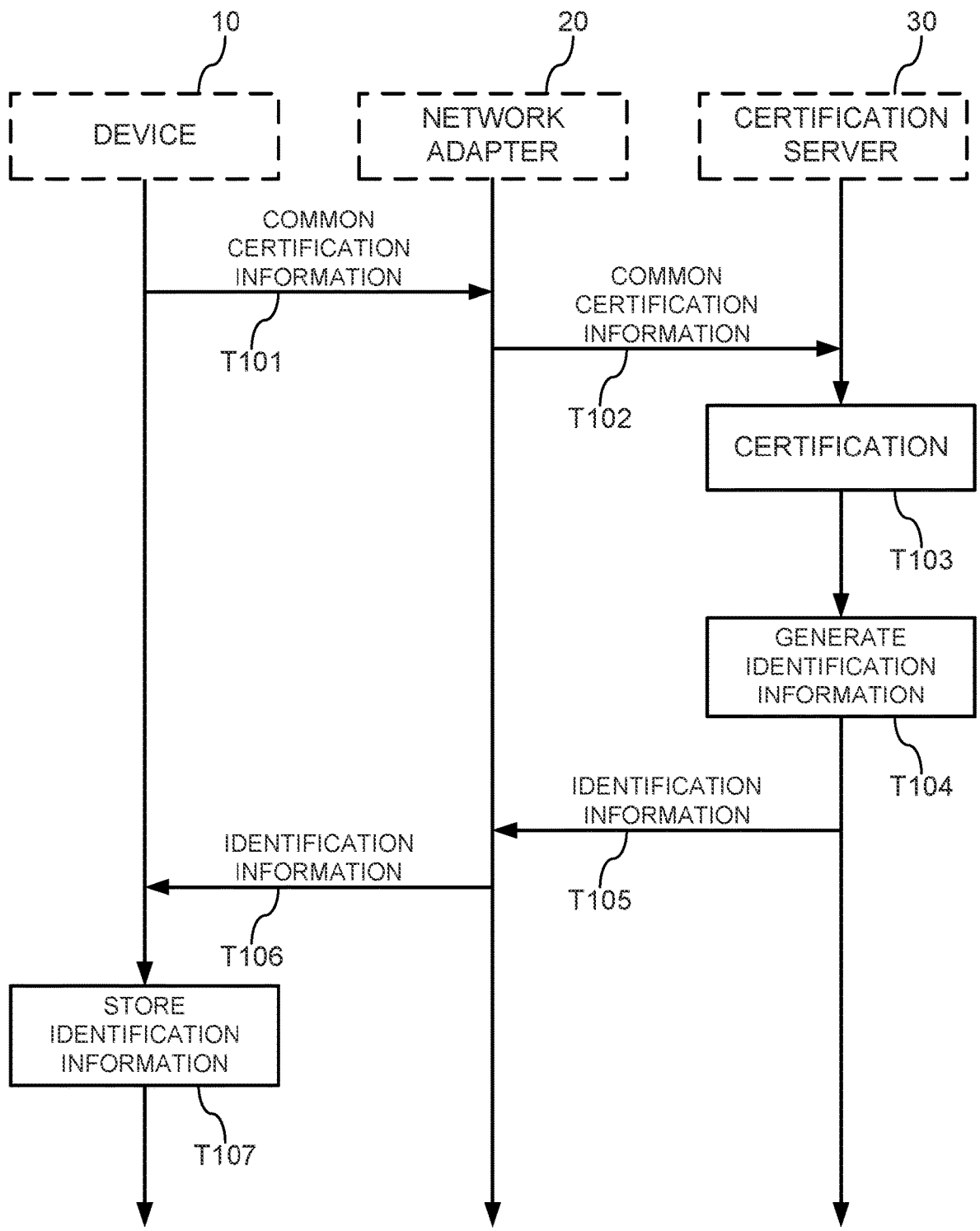
FIG. 6 is a sequence diagram illustrating an exemplary operation of setting of identification information in the device management system according to Embodiment 1 of the present disclosure.

An exemplary operation of setting of identification information in the device management system 1 is described below with reference to FIG. 6. The operation illustrated in FIG. 6 is started in response to activation of the device 10, to which the identification information D102 has not been set, for example.

The controller 100 of the device 10 transmits the common certification information D101 stored in the storage 120 to the network adapter 20, and the common certification information acquirer 201 of the controller 200 of the network adapter 20 acquires the common certification information D101 transmitted from the device 10 (Step T101).

The transferer 202 of the controller 200 then transfers the common certification information D101 to the certification server 30 (Step T102).

The certifier 301 of the controller 300 of the certification server 30 then certifies the device 10 on the basis of the common certification information D101 received from the network adapter 20, using the certification reference data D301 stored in the storage 320 (Step T103). When the certification of the device 10 fails in Step T103, the controller 300 notifies the network adapter 20 of unsuccessful certification, for example. The controller 200 of the network adapter 20 provided with the notification halts the communication with the certification server 30. This step interrupts the operation of setting of identification information in the device management system 1.

In contrast, when the certification of the device 10 succeeds in Step T103, the identification information generator 302 of the controller 300 generates identification information D102 for identification of the device 10 (Step T104).

The controller 300 transmits the identification information D102 generated in Step T104 to the network adapter 20 (Step T105).

The transferer 202 of the controller 200 of the network adapter 20 transfers the identification information D102 received from the certification server 30 to the device 10, and the setter 204 thereby sets the identification information D102 to the device 10 (Step T106).

The controller 100 of the device 10 causes the received identification information D102 to be stored into the storage 120 (Step T107).

The above-described operation can certify the device 10 on the basis of the common certification information D101 shared with other devices, and set the identification information D102 for identification of the certified device 10 to the device 10.

The above description is directed to the device management system 1 according to Embodiment 1. In this device management system 1, the device 10 is certified on the basis of the common certification information D101 shared with other devices, and the identification information D102 for identification of the certified device 10 is set to the device 10. The device management system 1 can thus achieve identification and certification of the device 10 without a step of incorporating information unique to the device 10 into the device 10 in its manufacturing process.

Embodiment 2

Figure 7:
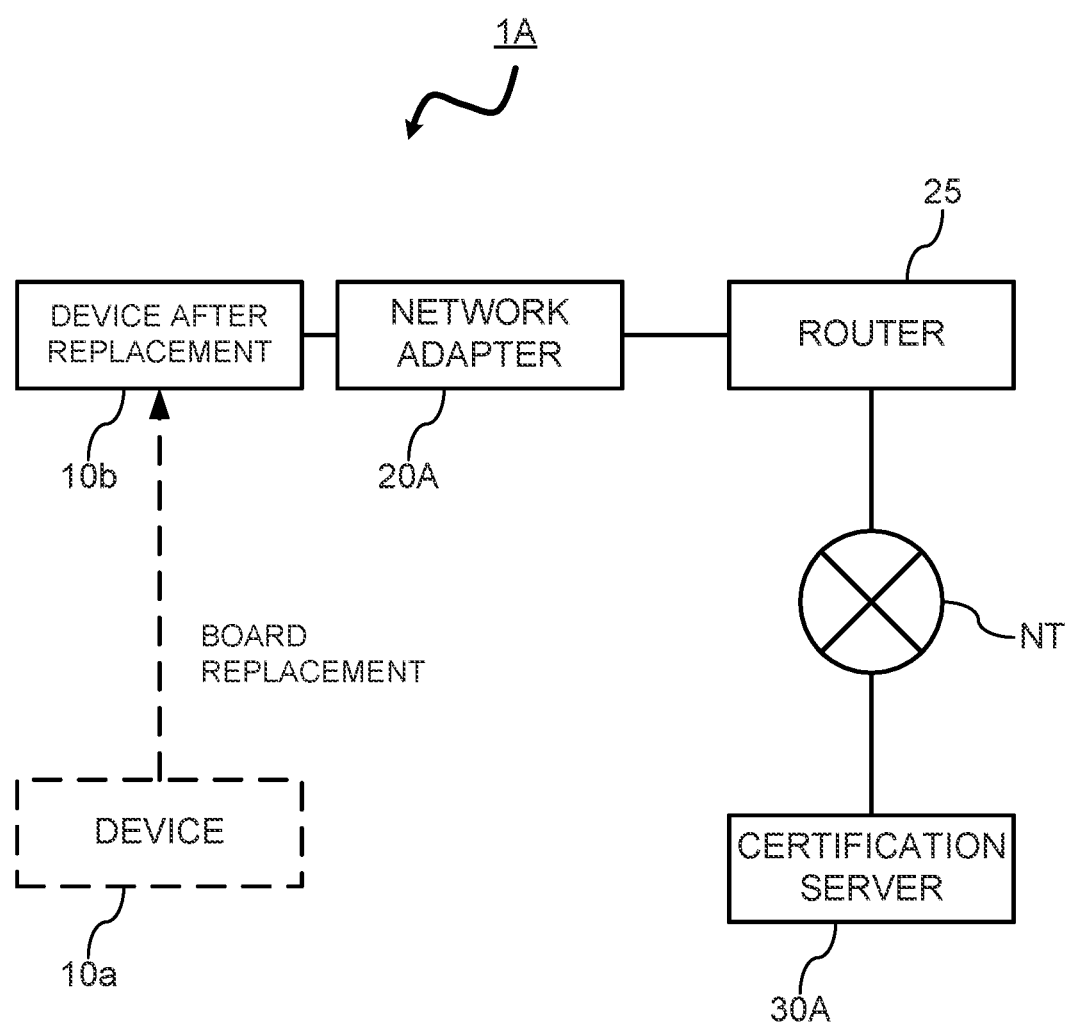
FIG. 7 illustrates a configuration of a device management system according to Embodiment 2 of the present disclosure.

A device management system 1A according to Embodiment 2 is described below with reference to FIG. 7. The device management system 1A can set identification information D102 for identification of the device 10a to the device 10a in which information unique to the device 10a was not embedded in the manufacturing process, like the device management system 1 according to Embodiment 1.

In the device management system 1A, even when the device 10a provided with the identification information D102 is subject to replacement of the control board and becomes a device 10b after replacement, the device 10b after replacement can take over the identification information D102 set to the device 10a before replacement of the board. For example, even after replacement of the control board for repair of the device 10a, the same identification information D102 as that before replacement can be used in services provided by the cloud server. The device 10a is represented by a dashed line in FIG. 7 so as to indicate that the replacement of the control board of the device 10a has changed the device 10a to the device 10b after replacement.

The certification of the device 10a and the setting of the identification information D102 to the device 10a in Embodiment 2 are completely the same as those in Embodiment 1 and are not redundantly described. The following description focuses on the state after the setting of the identification information D102 to the device 10a and replacement of the board of the device 10a. Some of the components corresponding to those in Embodiment 1 are not redundantly described.

The device management system 1A includes the device 10b after replacement, a network adapter 20A, the router 25, and a certification server 30A. The identification information D102 has already been set to the device 10a in advance of replacement of the board.

Figure 8:
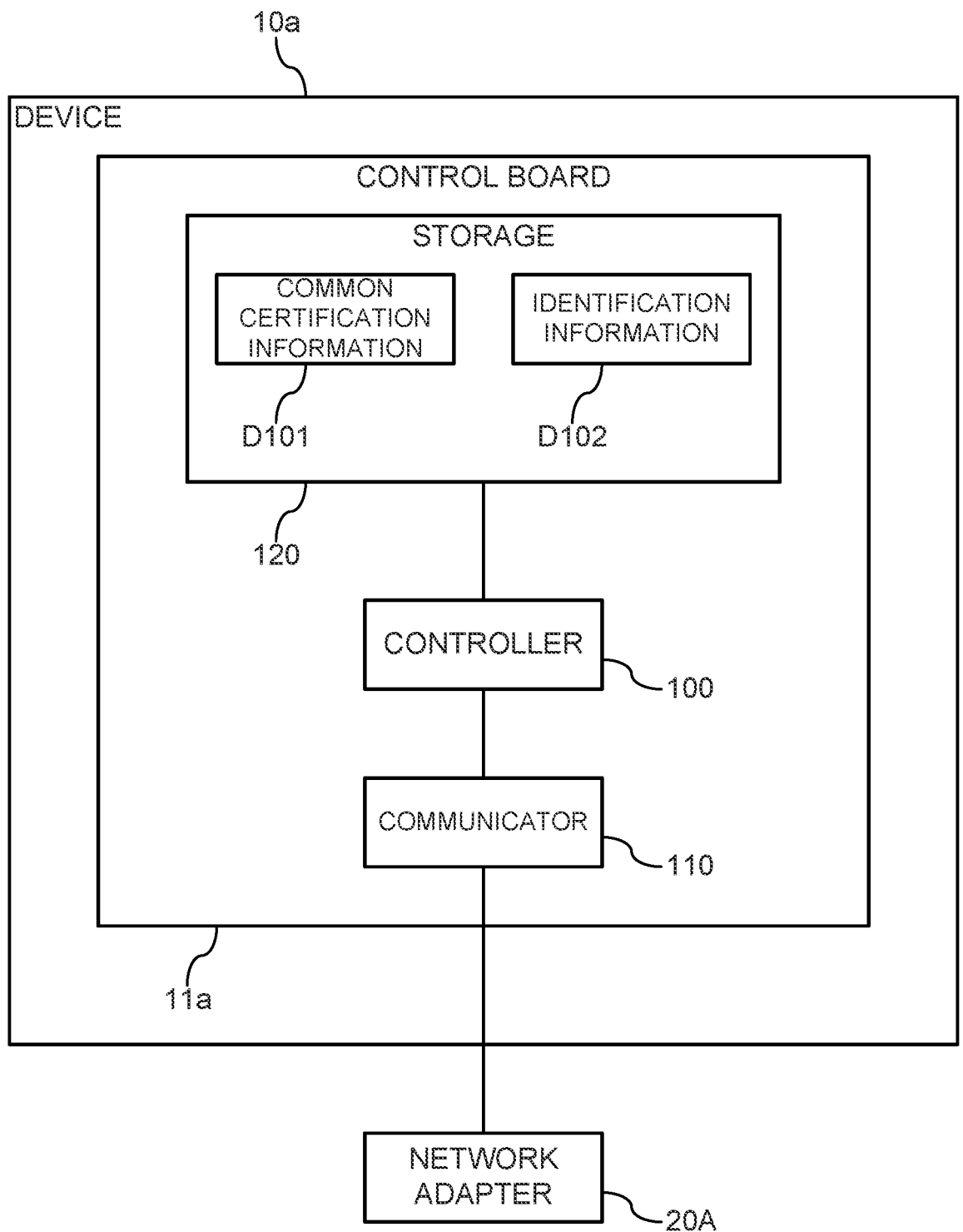
FIG. 8 illustrates a functional configuration of a device according to Embodiment 2 of the present disclosure.

A functional configuration of the device 10a before replacement of the board is described below with reference to FIG. 8. The functional configuration of the device 10a is substantially the same as that in Embodiment 1, but differs from that in Embodiment 1 in that the device 10a includes a control board 11a, which achieves the controller 100, the communicator 110, and the storage 120. The identification information D102 is represented by a solid line in FIG. 8, unlike FIG. 2, because the identification information D102 has already been set to the device 10a, as described above.

The control board 11a can be replaced with a replacement board 11b, which is described below. The device 10a of which the control board 11a is replaced with the replacement board 11b corresponds to the device 10b after replacement. The control board 11a is an example of a first component according to the present disclosure.

Figure 9:
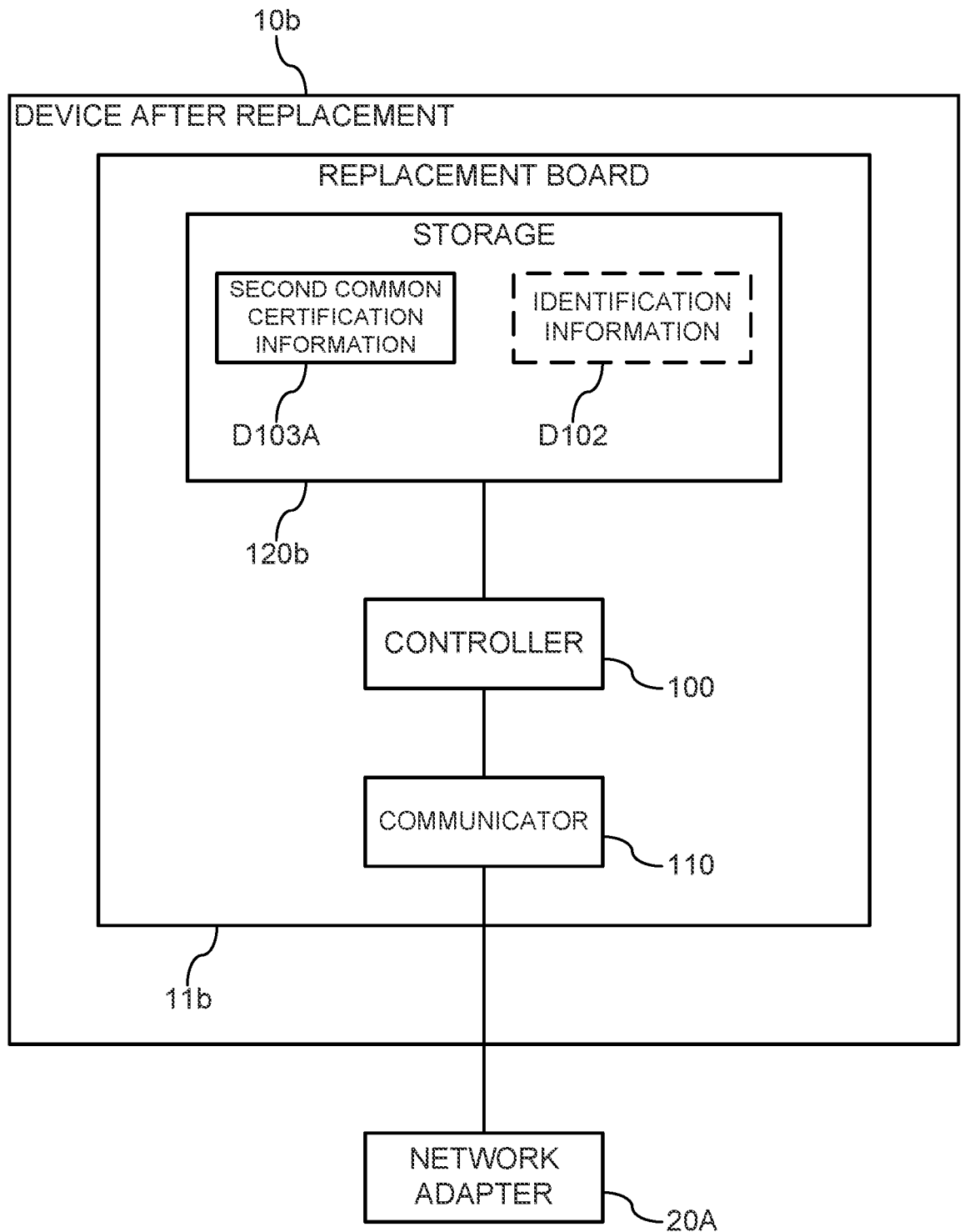
FIG. 9 illustrates a functional configuration of a device after replacement according to Embodiment 2 of the present disclosure.

A functional configuration of the device 10b after replacement of the board is described below with reference to FIG. 9. As described above, the device 10a of which the control board 11a is replaced with the replacement board 11b corresponds to the device 10b after replacement. That is, the device 10b after replacement differs from the device 10a in including the replacement board 11b instead of the control board 11a, and the other features of the device 10b are the same as those of the device 10a. The device 10b after replacement is an example of a device after replacement according to the present disclosure.

The replacement board 11b differs from the control board 11a in including a storage 120b instead of the storage 120, and the other features of the replacement board 11b are the same as those of the control board 11a. The storage 120b has the same functions as those of the storage 120, but differs from the storage 120 in that not the common certification information D101 but second common certification information D103A is stored into the storage 120b in the manufacturing process of the replacement board 11b. The replacement board 11b is an example of a second component according to the present disclosure. The storage 120b is an example of second storage means according to the present disclosure.

The second common certification information D103A, which is stored into the storage 120b in the manufacturing process of the replacement board 11b, is shared with other replacement boards. In other words, the second common certification information D103A on the device 10b after replacement is shared with other devices after replacement. Examples of the "other replacement boards" include replacement boards provided by the same manufacturer, replacement boards for the same model, and replacement boards of the same production lot.

The second common certification information D103A, which is shared with other replacement boards, differs from the common certification information D101 on the device 10a or the common certification information on other devices before replacement of the board. That is, the second common certification information D103A is certification information dedicated to replacement boards. The specific details of the second common certification information D103A are the same as those of the common certification information D101 and not redundantly described.

Figure 10:
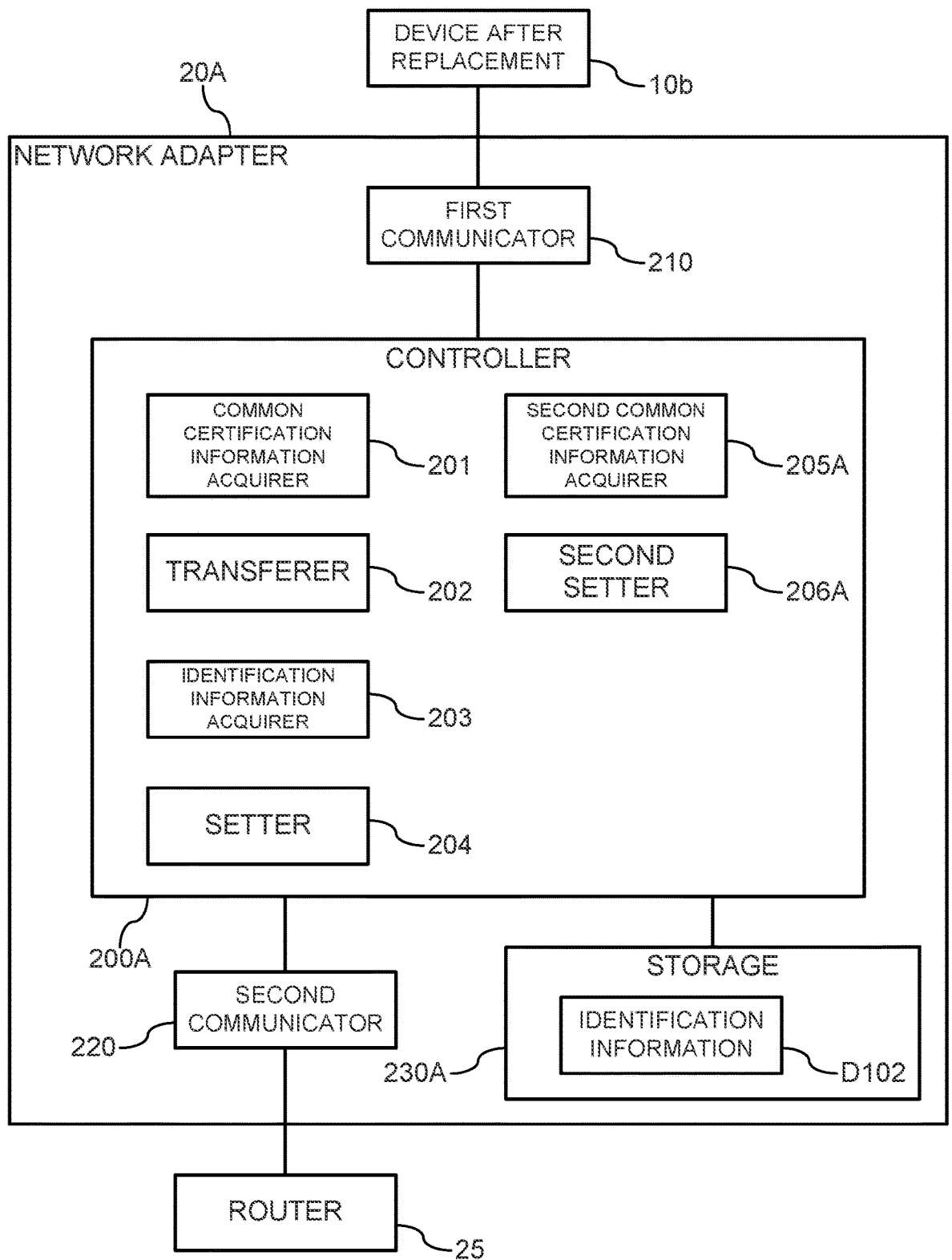
FIG. 10 illustrates a functional configuration of a network adapter according to Embodiment 2 of the present disclosure.

A functional configuration of the network adapter 20A is described below with reference to FIG. 10. The network adapter 20A differs from that in Embodiment 1 in further including a storage 230A and including a controller 200A instead of the controller 200.

The controller 200A differs from that in Embodiment 1 in further including a second common certification information acquirer 205A and a second setter 206A. The controller 200 also differs from that in Embodiment 1 in that the identification information D102 is stored into the storage 230A at the time of setting of the identification information D102 to the device 10a before replacement of the board.

The second common certification information acquirer 205A acquires the second common certification information D103A received from the device 10b after replacement. The acquired second common certification information D103A is transferred by the transferer 202 to the certification server 30A. The second common certification information acquirer 205A is an example of second common certification information acquiring means according to the present disclosure.

When receiving a notification of successful certification of the device 10b after replacement from the certification server 30A, the second setter 206A reads the identification information D102 stored in the storage 230A, and sets the identification information D102 to the device 10b after replacement. The second setter 206A can cause the device 10b after replacement to take over the identification information D102 set to the device 10a before replacement of the board. The second setter 206A is an example of second setting means according to the present disclosure.

The storage 230A stores the identification information D102, as described above. The storage 230A is an example of third storage means according to the present disclosure.

Figure 11:
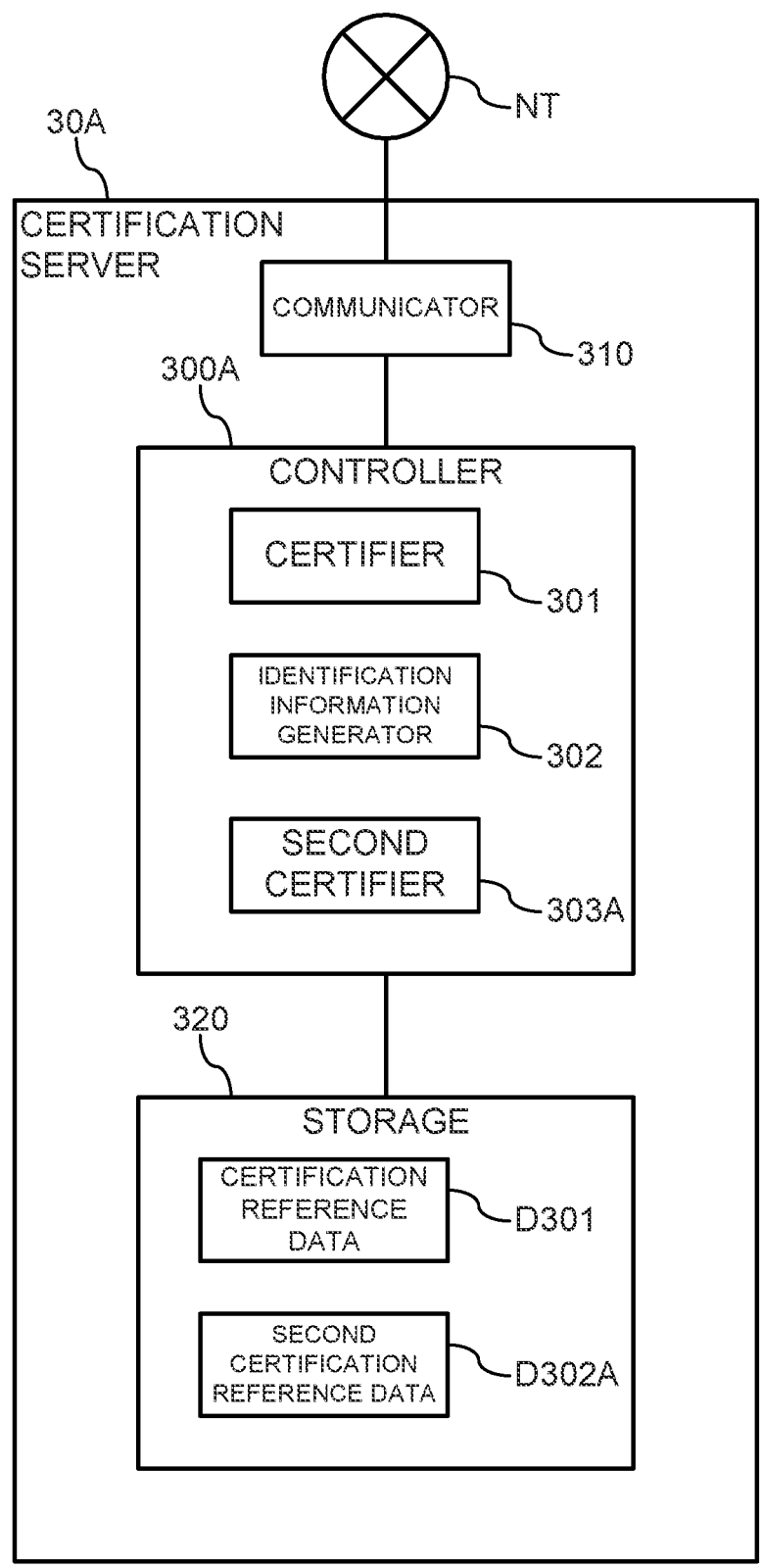
FIG. 11 illustrates a functional configuration of a certification server according to Embodiment 2 of the present disclosure.

A functional configuration of the certification server 30A is described below with reference to FIG. 11. The certification server 30A differs from that in Embodiment 1 in that the certification server 30A includes a controller 300A instead of the controller 300, and the storage 320 further stores second certification reference data D302A.

The controller 300A differs from that in Embodiment 1 in further including a second certifier 303A. The controller 300 also differs from that in Embodiment 1 in notifying the network adapter 20 of whether the certification at the second certifier 303A succeeds.

The second certifier 303A certifies the device 10b after replacement on the basis of the second common certification information D103A, using the second certification reference data D302A stored in the storage 320. The specific details of the certification process are the same as those at the certifier 301 and not redundantly described. The second certifier 303A is an example of second certification means according to the present disclosure.

The second certification reference data D302A stored in the storage 320 is used for certification of the device 10b after replacement on the basis of the second common certification information D103A. The specific details of the second common certification information D103A are the same as those of the certification reference data D301 and are not redundantly described.

The device 10a, the device 10b after replacement, the network adapter 20A, and the certification server 30A are achieved by the hardware configuration illustrated in FIG. 5, for example, like the device 10 and the like in Embodiment 1.

Figure 12:
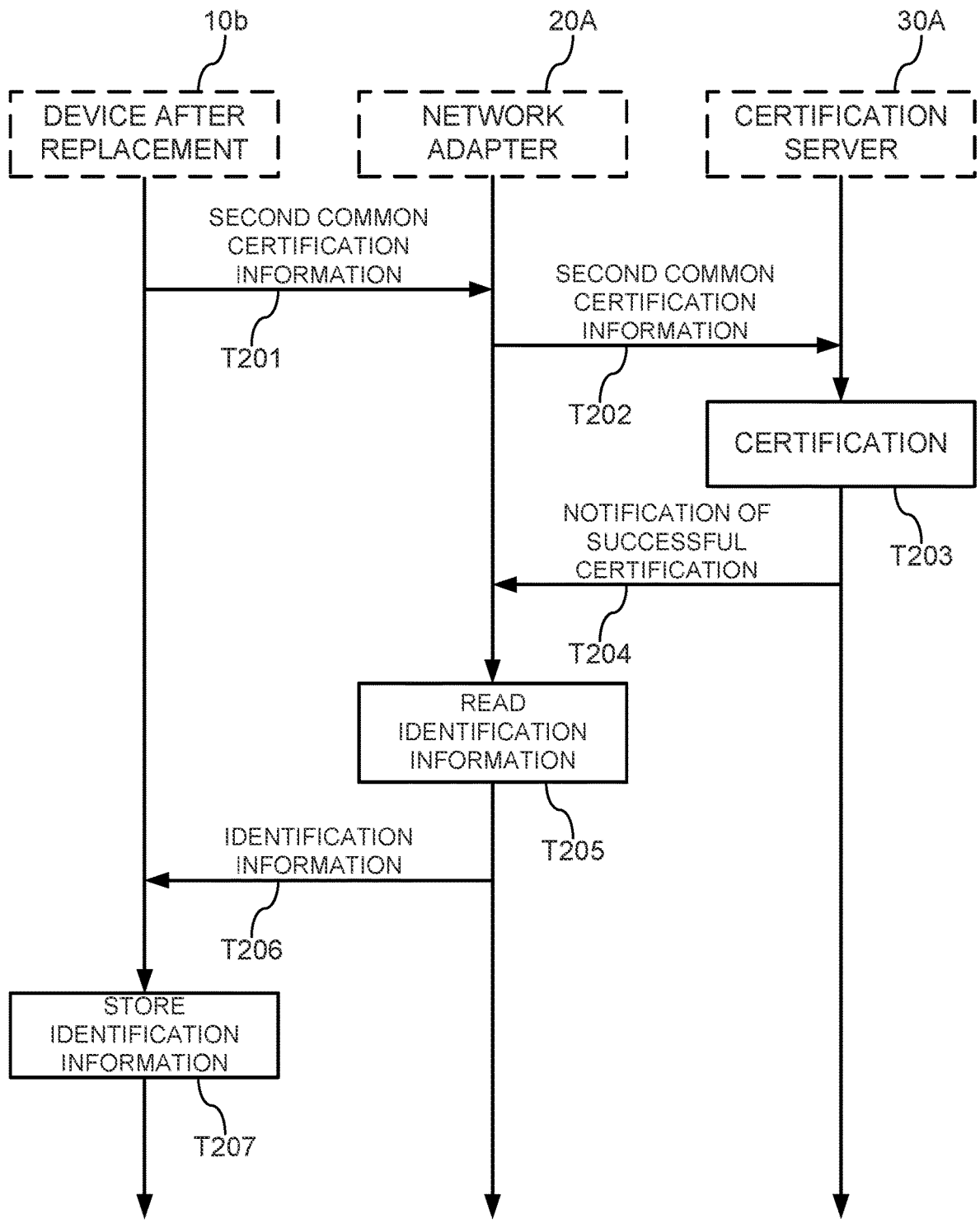
FIG. 12 is a sequence diagram illustrating an exemplary operation of setting of identification information to the device after replacement in the device management system according to Embodiment 2 of the present disclosure.

An exemplary operation of setting of identification information to the device 10b after replacement in the device management system 1A is described below with reference to FIG. 12. The operation illustrated in FIG. 12 is started in response to activation of the device 10b after replacement, to which the identification information D102 has not been set, for example.

The controller 100 of the device 10b after replacement transmits the second common certification information D103A stored in the storage 120b to the network adapter 20A, and the second common certification information acquirer 205A of the controller 200A of the network adapter 20A acquires the second common certification information D103A transmitted from the device 10b after replacement (Step T201).

The transferer 202 of the controller 200A then transfers the second common certification information acquirer 205A to the certification server 30A (Step T202).

The second certifier 303A of the controller 300A of the certification server 30A then certifies the device 10b after replacement on the basis of the second common certification information D103A received from the network adapter 20A, using the second certification reference data D302A stored in the storage 320 (Step T203). When the certification of the device 10b after replacement fails in Step T203, the controller 300A notifies the network adapter 20A of unsuccessful certification. The controller 200A of the network adapter 20A provided with the notification halts the communication with the certification server 30A. This step interrupts the operation of setting of identification information in the device management system 1A.

In contrast, when the certification of the device 10b after replacement succeeds in Step T203, the controller 300A notifies the network adapter 20A of successful certification (Step T204).

When receiving the notification of successful certification from the certification server 30A, the second setter 206A of the controller 200A of the network adapter 20A reads the identification information D102 stored in the storage 230A (Step T205).

The second setter 206A transmits the identification information D102 read in Step T205 to the device 10b after replacement, and thereby sets the identification information D102 to the device 10b after replacement (Step T206).

The controller 100 of the device 10b after replacement causes the received identification information D102 to be stored into the storage 120b (Step T207).

The above-described operation can certify the device 10b after replacement on the basis of the common certification information D101 shared with other devices after replacement, and cause the identification information D102, set to the device 10a before replacement of the board, to be also set to the device 10b after replacement.

The above description is directed to the device management system 1A according to Embodiment 2. In the device management system 1A, when the device 10a is subject to replacement of the control board 11a with the replacement board 11b and becomes the device 10b after replacement, the device 10b after replacement is certified on the basis of the second common certification information D103A shared with other devices after replacement, and the identification information D102 set to the device 10a is set to the certified device 10b after replacement. The device 10b after replacement can therefore take over the identification information D102 set to the device 10a when the device 10a is subject to replacement of the control board 11a with the replacement board 11b and becomes the device 10b after replacement.

Modification 1

In Embodiments 1 and 2, the individual functional parts of the network adapters 20 and 20A may be provided in the certification servers 30 and 30A, and the individual functional parts of the certification servers 30 and 30A may be provided in the network adapters 20 and 20A, within the scope of common technical knowledge of persons skilled in the art.

Figure 13:
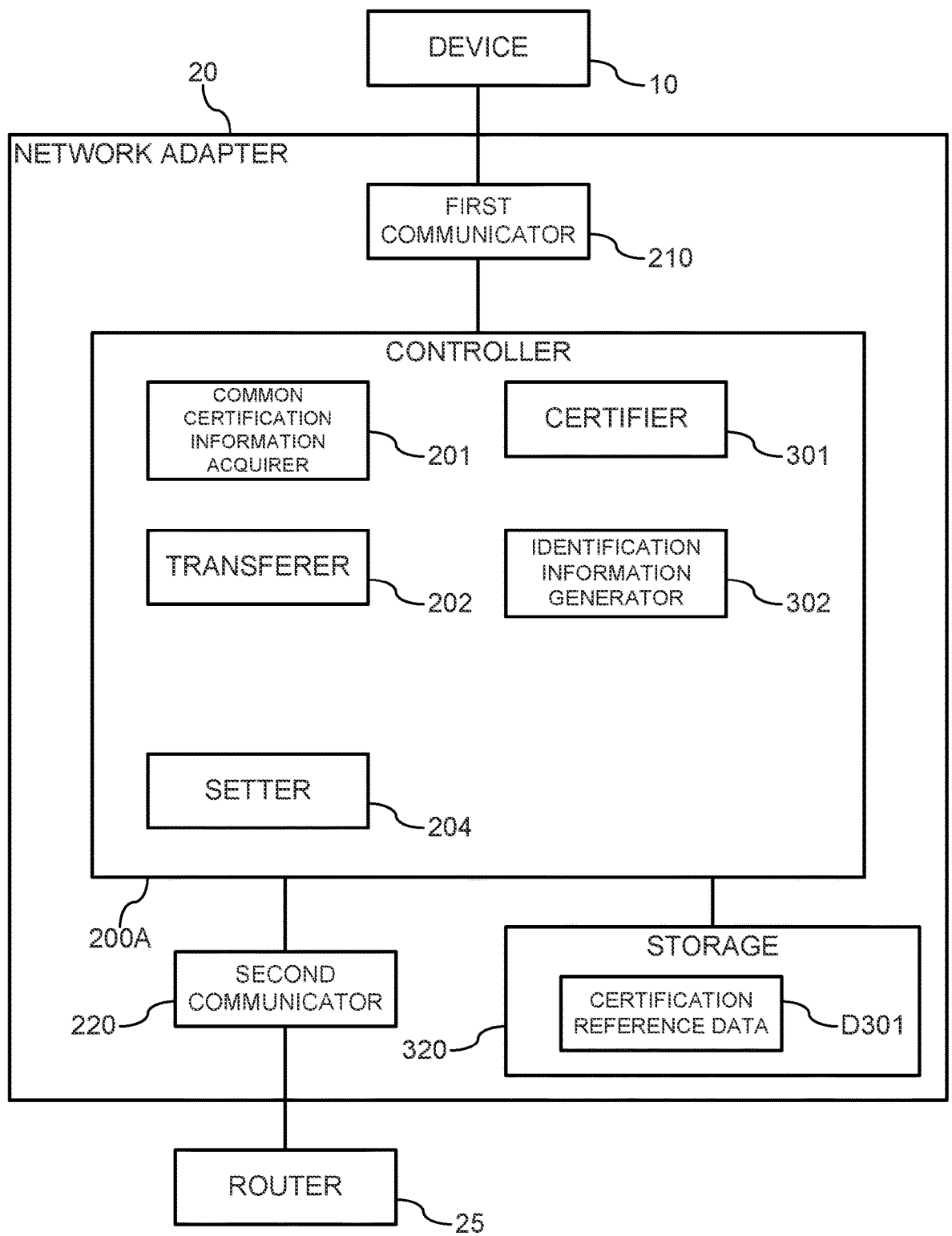
FIG. 13 illustrates a functional configuration of a network adapter according to Modification 1 of the embodiments of the present disclosure.

For example, as illustrated in FIG. 13, the network adapter 20 may include the certifier 301, the identification information generator 302, and the storage 320. This network adapter 20 can certify the device 10, generate identification information, and set the identification information to the device 10, without communicating with the certification server 30. This configuration can establish a device management system without a certification server. The network adapter 20 includes the identification information generator 302 and therefore excludes the identification information acquirer 203. The identification information generated by the identification information generator 302 of the network adapter 20 is, for example, an identifier configured by coupling the media access control (MAC) address unique to the network adapter 20, a character string indicating the date and time of certification of the device 10, and a character string generated at random.

Alternatively, the network adapter 20 may include the identification information generator 302, and the controller 300 of the certification server 30 may notify the network adapter 20 of whether the certification at the certifier 301 succeeds, for example. That is, the certification server 30 may be responsible for certification while the network adapter 20 may be responsible for generation of identification information.

Modification 2

In Embodiments 1 and 2, the identification information D102 may contain individual certification information for individual certification of the devices 10 and 10a. For example, the identification information generated by the identification information generator 302 of the certification server 30 may be information containing an identifier generated as described above, and an electronic signature obtained by signing this identifier with a signing key retained in the certification server 30. In this case, the electronic signature serves as the individual certification information. For example, a verification key corresponding to the signing key in the certification server 30 is preliminarily fed to the could server that provides services for the device 10, and the cloud server verifies the electronic signature using the verification key, so that the electronic signature allows the could server to individually certify the device 10. Alternatively, the identification information generator 302 of the certification server 30 may issue a digital certificate pursuant to the X.509 standard for each device, and this digital certificate may serve as the individual certification information. In this case, the certification server 30 functions as a certification authority for issuing the digital certificate.

Modification 3

In Embodiment 1, the network adapter 20 transmits the common certification information D101 acquired from the device 10 to the certification server 30, and the certification server 30 certifies the device 10 on the basis of the received common certification information, using the certification reference data D301. The device 10 can also be certified on the basis of the common certification information D101 without transmission of the common certification information D101 itself to the certification server 30. In an exemplary case where the common certification information D101 is identical to the certification reference data D301, a challenge-response system allows the certification server 30 to confirm that the common certification information D101 coincides with the certification reference data D301, without transmission of the common certification information D101 itself to the certification server 30. The same holds true for Embodiment 2.

Other Modifications

Although the replaceable control board 11a includes the controller 100, the communicator 110, and the storage 120 in Embodiment 2, the replaceable control board 11a does not have to include all the components provided that the replaceable control board 11a includes the storage 120. For example, only the storage 120 may be provided on the replaceable control board 11a. The same holds true for the replacement board 11b and the storage 120b.

In Embodiment 1, after the setting of the identification information D102, the device 10 may delete the common certification information D101 preliminarily stored in the storage 120. The deletion of the common certification information D101 can reduce the risk of leakage of the common certification information D101.

Alternatively, the device 10 may have an initializing function, and may delete the identification information D102 during the initialization. In an exemplary case where the device 10 is associated with a user by the cloud server on the basis of the identification information D102 and then transferred to another user, the deletion of the identification information D102 during the initialization can prevent the information on the other user from being contaminated with information on the original user before transfer.

Although the device 10 or the like includes the secondary storage unit 5004 in the hardware configuration illustrated in FIG. 5, this configuration is a mere example. The secondary storage unit 5004 may be provided outside the device 10 or the like, and the device 10 or the like may be connected to the secondary storage unit 5004 via the interface 5003. In this modification, a removable medium, such as USB flash drive or memory card, may also serve as the secondary storage unit 5004. The information, such as common certification information and identification information, stored in the removable medium is preferably stored after encryption in order to avoid leakage.

Instead of the hardware configuration illustrated in FIG. 5, the device 10 or the like may be configured by a dedicated circuit including an application specific integrated circuit (ASIC) or a field programmable gate array (FPGA), for example. Alternatively, the functions of the device 10 or the like in the hardware configuration illustrated in FIG. 5 may be partially performed by a dedicated circuit connected to the interface 5003, for example.

The program used in the device 10 or the like may be stored in a non-transitory computer-readable recording medium, such as compact disc read only memory (CD-ROM), digital versatile disc (DVD), USB flash drive, memory card, or HDD, to be distributed. This program is installed in a specific computer or general purpose computer to cause the computer to function as the device 10 or the like.

The program may also be stored in a storage device included in another server on the Internet and downloaded from the server into a computer.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 1, 1A Device management system
10, 10a Device
10b Device after replacement
11a Control board
11b Replacement board
20, 20A Network adapter
25 Router
30, 30A Certification server
100 Controller
110 Communicator
120, 120b Storage
200, 200A Controller
201 Common certification information acquirer
202 Transferer
203 Identification information acquirer
204 Setter
205A Second common certification information acquirer
206A Second setter
210 First communicator
220 Second communicator
230A Storage
300, 300A Controller
301 Certifier
302 Identification information generator
303A Second certifier
310 Communicator
320 Storage
5000 Bus
5001 Processor
5002 Memory
5003 Interface
5004 Secondary storage unit
D101 Common certification information
D102 Identification information
D103A Second common certification information
D301 Certification reference data
D302A Second certification reference data
NT Internet

The invention claimed is:

1. A device management system comprising:
a network adapter connected to a device, the device comprising a first component that comprises a first storage and is replaceable with a second component comprising a second storage;
a first certifier to certify the device; and
an identification information generator to generate identification information for identification of the device certified by the first certifier;
a second certifier to certify the device after replacement of the first component with the second component, wherein
the network adapter comprises:
a first common certification information acquirer to acquire, from the device, first common certification information stored in the first storage, the first common certification information being shared with another device;
a first setter to set the identification information to the device;
a third storage to store the identification information;
a second common certification information acquirer to acquire, from the device after replacement, second common certification information stored in the second storage, the second common certification information being shared with another device after replacement; and
a second setter to set the identification information stored in the third storage to the device after replacement certified by the second certifier,
the first certifier certifies the device based on the first common certification information, and
the second certifier certifies the device after replacement based on the second common certification information.

2. The device management system according to claim 1, wherein the identification information includes individual certification information for individual certification of the device.

3. The device management system according to claim 1, further comprising:
the device.

4. A network adapter connectable to a device including a first component that includes a first storage and is replaceable with a second component including a second storage, the network adapter comprising:
a first common certification information acquirer to acquire, from the device, first common certification information stored in the first storage the first common certification information being shared with another device;
a first setter to set identification information to the device, the identification information being generated for identification of the device certified based on the first common certification information;
a third storage to store the identification information;
a second common certification information acquirer to acquire second common certification information stored in the second storage from the device after replacement of the first component with the second component, the second common certification information being shared with another device after replacement; and
a second setter to set the identification information stored in the third storage to the device after replacement certified based on the second common certification information.

5. A device comprising:
a first component comprising s first storage into which first common certification information is stored, the first common certification information being shared with another device; and
an identification information retainer to cause identification information to be stored into the first storage, the identification information being generated for identification of the device certified based on the first common certification information, wherein
the first component is replaceable with a second component comprising a second storage, and
second common certification information is stored in the second storage, the second common certification information being shared between the device after replacement of the first component with the second component and another device after replacement.

6. A device management method comprising:
certifying a device based on first common certification information stored in a first storage included in a first component of the device, the first component being replaceable with a second component comprising a second storage, the first common certification information being shared with another device;
setting identification information to the device, the identification information being for identification of the certified device;
certifying the device after replacement of the first component with the second component based on second common certification information stored in the second storage of the device after replacement, the second common certification information being shared with another device after replacement; and
setting the identification information that is set to the device to the certified device after replacement.

7. A non-transitory computer-readable recording medium storing a program, the program causing a computer to function as:
a first common certification information acquirer to acquire first common certification information from a device comprising a first component comprising a first storage for storing the first common certification information, the first component being replaceable with a second component comprising a second storage, the first common certification information stored in the first storage means being shared with another device;
a first setter to set identification information to the device, the identification information being for identification of the device certified based on the first common certification information;
a third storage to store the identification information;
a second common certification information acquirer to acquire second common certification information stored in the second storage from the device after replacement of the first component with the second component, the second common certification information being shared with another device after replacement; and
a second setter to set the identification information stored in the third storage to the device after replacement certified based on the second common certification information.

* * * * *